Oct. 1, 1957   D. J. FRENCH   2,808,273
ADJUSTABLE DRAFT MECHANISM FOR MULTIPLE TRAILING VEHICLES
Filed June 30, 1954
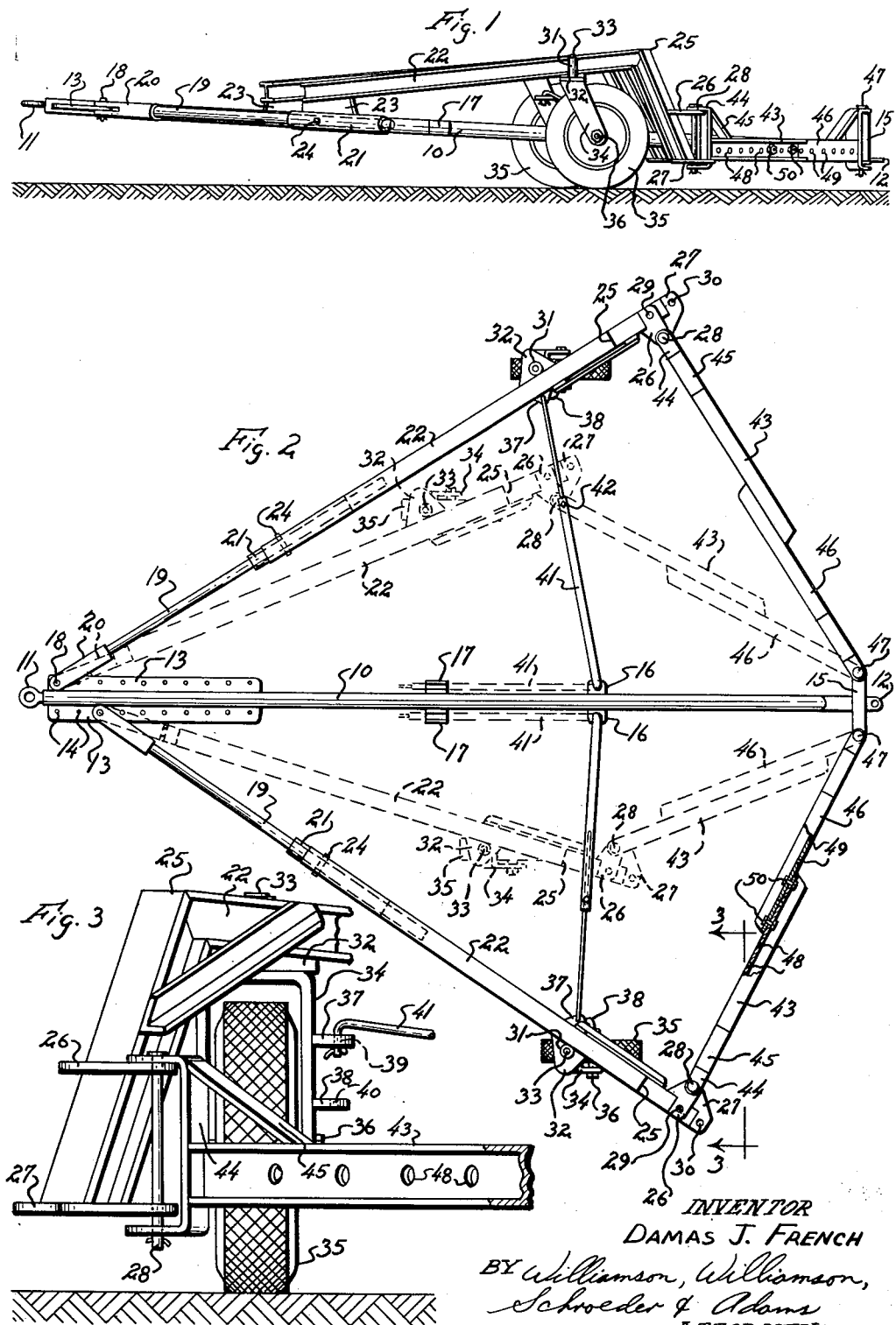
INVENTOR
DAMAS J. FRENCH
BY Williamson, Williamson,
Schroeder & Adams
ATTORNEYS United States Patent Office 2,808,273
Patented Oct. 1, 1957

2,808,273
ADJUSTABLE DRAFT MECHANISM FOR MULTIPLE TRAILING VEHICLES

Damas J. French, Grafton, N. Dak.

Application June 30, 1954, Serial No. 440,313

1 Claim. (Cl. 280—412)

This invention relates to hitch mechanism and more particularly to a device for securing to the draft plate of a device such as the tractor and for positioning the drawbars of implements at controlled and spaced intervals behind the device.

It is an important object of the invention to provide a hitch mechanism which is simple and efficient and will accommodate a plurality of implements drawn to the rear of a power vehicle, the implements being positionable in controlled lateral position as well as longitudinal relation.

It is another object of the invention to provide a hitch mechanism having a wheeled framework of such a nature that the wheels may be adjusted simultaneously with the adjustment of the hitch framework whereby the wheels may be caused to track in a controlled spaced relation behind a tractor or the like and the draft connections between implements drawn to the rear of the device may likewise be controlled at will.

It is a further object of the invention to provide an efficient and strong hitch mechanism with a minimum of parts to accomplish a multiple adjustment for spacing and positioning of drawn implements and for adapting the hitch mechanism to travel at high speed as when transporting it from one field to another.

It is a still further object to provide a hitch mechanism in which a simple adjustment can be accomplished to vary the positioning of drawn implements positioned to the rear of the hitch mechanism while preserving the horizontal relationship of the parts and allowing the wheels of the device to pivot freely in any position.

These and other objects and advantages of my invention will more fully appear from the following description made in connection with the accompanying drawings wherein like reference characters refer to similar parts throughout the several views and in which:

Fig. 1 is a side elevation of my hitch mechanism with the farthest wheel in advanced adjustment and the device disposed in natural operating position;

Fig. 2 is a top plan view of the hitch mechanism as adjusted in Fig. 1, a new adjusted position being indicated in dotted lines, portions of the drawing are cut away in horizontal section to better show the structure of the arm interconnection; and Fig. 3 is an enlarged segmental view of the interconnection between the adjustable arm and the beam member, taken in the direction of the arrows 3—3 of Fig. 2.

Referring now more particularly to the drawing, the hitch mechanism is shown in natural operating position in Fig. 1. The drawbar 10 extends for the full length of the mechanism, terminating at its forward end in a connecting piece 11 which is adapted to be secured at the rear of a vehicle such as a tractor (not shown) and constituting a conventional hitch member. The rear of the drawbar may terminate in a fixed hitch connection 12 which forms one of a plurality of hitch connections as will be described below.

My device contemplates a framework combined with the drawbar 10, the framework being disposed to one side thereof and comprised of adjustable members which will create a multiplicity of triangular configurations. It is contemplated that a single framework disposed to one side of the drawbar 10 would constitute a useful device for the fulfillment of the objects set forth herein but the versatility of my device may be increased many fold by providing a dual framework, one at each side of the drawbar as illustrated. It is to be understood that if one framework were utilized with the drawbar 10, then any wheel structure associated therewith would necessarily require one of the wheels to be mounted upon or adjacent the drawbar 10 itself. Since this arrangement would be similar to that disclosed, no detailed showing is made of the arrangement. It is further understood, of course, that the wheel if mounted to the drawbar 10 itself would be so positioned with respect thereto as to be rotatable in clearance wtih all the structural parts of the hitch mechanism.

As this specification progresses, each of the members disposed at one side of the drawbar will be individually described, it being understood that similar or identical parts may be secured to the other side of the drawbar so as to constitute a dual framework independently adjustable both for width and longitudinal location.

Attached to the forward end of the drawbar 10 is a plate 13 having spaced openings 14 located therealong for pivotal attachment to the frame member. A transverse bracket 15 is rigidly secured adjacent the rear end of the drawbar 10, also for pivotally securing to the framework. Intermediate the ends of the drawbar 10 is further bracket member 16 having pivotal connection with brace means and a rest member 17 lies forwardly of the bracket 16 positioning the bracing means when not in use.

The frame has an extensible and retractable longitudinal member pivotally mounted at its inner end to the plate 13 by means of pivot pin 18 which in turn passes through one of the openings 14 disposed in plate 13.

The extensible and retractable longitudinal member comprises in turn the rod 19 having a clevis 20 at its inner and forward end through which the pivot pin 18 extends and the rearward end of rod 19 is adjustably engaged with a sleeve member 21 as shown in Fig. 1. Sleeve member 21 is secured as by welding to the beam 22, a wedge plate 23 being preferably interposed therebetween so as to angulate the beam 22 with respect to the sleeve 21. It will be noted that the sleeve 21 lies in the same plane with drawbar 10 so that sliding sleeve 21 adjustably along the rod 19 will not cause the beam 22 to change angles with respect to the drawbar. Fastening means such as set screw 24 may be threadably mounted through the side of sleeve 21 so as to engage the bar 19 in rigid adjusted position. The beam 22 extends upwardly and rearwardly to an apex 25 and thence bends downward sharply to terminate in a pair of brackets 26 and 27 having aligned openings through which king pin 28 can pass as shown in Fig. 3. Each of the brackets 26 and 27 has an opening therethrough at 29 and 30 respectively. There are several inches of space between the brackets 26 and 27 so that an implement to be secured at that position may have its drawbar mounted upon one or the other depending upon the height desired.

Adjacent the apex 25 of the beam 22 is secured a journal 31, the journal being attached to the beam and to a bracket 32 secured underneath the beam as shown in Figs. 1 and 2. The journal 31 is adapted to receive a stub shaft 33 which in turn is rigidly formed at the upper end of the bifurcated wheel mount 34. The bifurcated wheel mount 34 has a wheel 35 journaled for free rotation therewithin as at shaft 36. It will be noted that the bifurcated member 34 is angulated with respect to the axis of stub shaft 33 so that the wheel 35 will trail in the direction of travel. The wheel 35 and its mounting 34 and 36 constitutes a dolly wheel which can rotate in a complete circle without engaging any of the framework or otherwise becoming jammed or inoperative. The bifurcated member 34 has a lateral pair of brackets 37 and 38 as shown in Figs. 2 and 3, each of the brackets 37 and 38 having an opening 39 and 40 respectively. A telescopic brace 41 extends across the brackets 16 and one of brackets 37 and 38 so as to rigidly maintain the dolly wheel 35 in nonrotative position, such as when traveling down a highway at a high rate of speed. The telescopic brace member 41 may be provided with a securing means such as set screw 42 so as to adjust and rigidly maintain a predetermined length of brace 41 between the brackets 37 and 16. The brace 41 may be collapsed by unscrewing the set screw 42 and can then be brought to a rest position adjacent the drawbar 10 and lying upon the retaining bracket 17.

As previously noted, the king pin 28 extends through brackets 26 and 27 and additionally provides a pivot connection for the extensible and retractable lateral member at the outer end of movable arm 43 as shown in Figs. 2 and 3. The pivotal connection is made between a U-shaped clevis member 44 having openings aligned with those in brackets 26 and 27 so that the king pin 28 can extend therethrough and maintain the framework in adjusted position. Additional bracing means 45 may be interposed between the U-shaped bracket 44 and the movable arm 43 so as to rigidify the frame to a greater degree. The inner arm 46 of the lateral extensible and retractable member is pivotally mounted by means of pin 47 to the lateral brace 15 as shown in Fig. 2. The movable arm 43 can be mounted in a plurality of longitudinal positions with respect to the inner arm 46 by securing together the arms through matched openings 48 in arm 43 with openings 49 in arm 46, the fastening being accomplished by such means as a pair of bolts 50 as shown in Figs. 1 and 2.

In the use and operation of my device, I secure the hitch 11 to the rear end of a tractor or similar vehicle and adjust the arm 43 longitudinally with respect to arm 46 until I achieve the desired spacing between the hitch 26—27 and the fixed hitch member 12. Bolts 50 are then secured so as to rigidly maintain the movable outer arm 43 with respect to the inner arm 46. Where I desire to vary the longitudinal spacing between the hitch 26—27 and the fixed hitch 12 I may select one of a plurality of openings 14 in the plate 13, replacing the pivot pin 18 when the desired adjustment has been made. The plate 13 provides a quick adjustment through a limited distance but if a more drastic longitudinal spacing is required the bar 19 may be slid to its desired position within the sleeve 21, the set screw 24 being temporarily loosened to effect the adjustment. Whenever this adjustment is made on the sleeve 21, it is preferred to have the pin 18 in a medial position on plate 13 so that flexibility can be gained in effecting the minor adjustment on plate 13 and in either direction. The drawbar of each implement is then placed in the desired hitch member 26 or 27 and in the fixed hitch 12. For example, where it is desired to pull several gang discs, one may be pulled forwardly of the other so that their projected paths overlap. In such instance, it is desirable to use the dual frame arrangement as shown in Fig. 2, the framework at one side being independently adjustable with respect to the framework at the other side. The lateral adjustment through arms 43 and 46 may be effected for a number of purposes, for example to get the right overlap of a plurality of drawn implements such as discs, drags and plows, or it may be arranged so as to cause the dolly wheels and implement wheels to track between rows of plants such as when cultivating corn. It will be noted that the dolly wheel 35 moves inwardly and outwardly with the beam 22 and hence can be caused to separate from its counterpart on the opposite frame by a predetermined distance and in a fixed relationship with the wheels of the tractor if desired.

It will further be noted that both frameworks can be angulated with the hitches 26—27 forwardly of the fixed hitch 12, with both hitches 26—27 angulated rearwardly of the fixed hitch 12, or with one of the frame hitches or movable hitches disposed forwardly and the other disposed rearwardly.

Thus it may be seen that a plurality of drawn implements can be properly spaced for lateral positioning with respect to the tractor and with respect to one another and further can be advanced or retarded in the direction of travel so that any one may be caused to precede any of the others. Even though the hitch mechanism performs a multiplicity of purposes, it has been simply constructed and is easy to adjust both for operative use and for travel on a highway.

It will, of course, be understood that various changes may be made in the form, details, arrangement and proportions of the parts without departing from the scope of my invention.

What I claim is:

A hitch mechanism for attachment at its forward end to a powered vehicle such as a tractor and attachment at the rear thereof to one or more drawn implements, said mechanism comprising an elongated drawbar having means at its forward end for pivotal connection with said vehicle, a pair of arms secured together and adjustable lengthwise for extension and retraction, one of said arms being pivotally mounted to a rearward position on the drawbar, an elongated rod pivotally mounted at one end to a forward position on said drawbar, a beam having an upwardly angled apex adjustably secured at its forward end to the rearward end of said rod, the other of said arms and the rearmost portion of said beam being pivotally secured together, and a plurality of hitch connections secured in spaced relation at the rear of the frame and connected with said extensible and retractable arms whereby spacing therebetween may be adjusted relatively both for width and for length.

References Cited in the file of this patent
UNITED STATES PATENTS

| | | |
|---|---|---|
| 1,467,573 | Engelhardt | Sept. 11, 1923 |
| 1,636,802 | Bozard | July 26, 1927 |
| 2,658,770 | Koenig | Nov. 10, 1953 |

FOREIGN PATENTS

| | | |
|---|---|---|
| 21,969 | Denmark | Feb. 21, 1917 |